US010986908B2

(12) United States Patent
Hwang

(10) Patent No.: US 10,986,908 B2
(45) Date of Patent: Apr. 27, 2021

(54) CASE FOR ELECTRONIC DEVICE

(71) Applicant: Research & Business Foundation Sungkyunkwan University, Suwon-si (KR)

(72) Inventor: Keum Cheol Hwang, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 16/738,082

(22) Filed: Jan. 9, 2020

(65) Prior Publication Data

US 2020/0221839 A1 Jul. 16, 2020

(30) Foreign Application Priority Data

Jan. 10, 2019 (KR) ........................ 10-2019-0003179

(51) Int. Cl.
*H04B 1/3827* (2015.01)
*H01Q 1/42* (2006.01)
*A45C 11/00* (2006.01)

(52) U.S. Cl.
CPC ............. *A45C 11/00* (2013.01); *H01Q 1/421* (2013.01)

(58) Field of Classification Search
CPC .......... H01Q 1/42; H01Q 1/421; H01Q 1/425; H04B 1/3888; H04B 1/3827; H04M 1/02
See application file for complete search history.

(56) References Cited

U.S. PATENT DOCUMENTS 7,876,272 B2 * 1/2011 Dou ........................ H01Q 21/28 343/702
9,838,060 B2 * 12/2017 McCaughey ....... H04M 1/0202
2012/0206303 A1 * 8/2012 Desclos ................. H01Q 1/243 343/702
2016/0072539 A1 * 3/2016 Hu ........................ H04B 1/3888 455/575.8
2016/0309007 A1 * 10/2016 Irci ........................ H01Q 1/243
2017/0108894 A1 * 4/2017 Tannous ................ G06F 1/1628
(Continued)

FOREIGN PATENT DOCUMENTS

JP 2011-155527 8/2011
JP 2015-187716 A 10/2015
KR 10-0811793 B1 3/2008
(Continued)

OTHER PUBLICATIONS

Korean Office Action dated Sep. 3, 2019 in corresponding Korean Patent Application No. 10-20191-0003179 (3 pages in Korean).
(Continued)

*Primary Examiner* — Blane J Jackson
(74) *Attorney, Agent, or Firm* — NSIP Law

(57) ABSTRACT

A case for an electronic device according to the present disclosure meta-groves having different structures and formed symmetrically, asymmetrically, periodically, or non-periodically or meta-patches attached symmetrically, asymmetrically, periodically, or non-periodically at positions where the meta-grooves are formed, thereby improving the performance of antennas. Accordingly, there is an effect that it is possible to usefully use a mobile electronic device including arranged antennas therein even in a 5G environment having a millimeter wave band.

8 Claims, 9 Drawing Sheets

(56) References Cited

U.S. PATENT DOCUMENTS

| | | | | |
|---|---|---|---|---|
| 2018/0034134 | A1* | 2/2018 | Dalmia | H01Q 19/30 |
| 2020/0052405 | A1* | 2/2020 | Park | H01Q 9/0428 |

FOREIGN PATENT DOCUMENTS

| | | | |
|---|---|---|---|
| KR | 10-2009-0060477 | A | 6/2009 |
| KR | 10-1080518 | B1 | 11/2011 |
| KR | 20-0465510 | Y1 | 10/2012 |
| KR | 10-1198940 | B1 | 11/2012 |
| KR | 10-2013-0021791 | A | 3/2013 |
| KR | 10-2013-0045038 | A | 5/2013 |
| KR | 10-2013-0062751 | | 6/2013 |
| KR | 10-1291044 | B1 | 8/2013 |
| KR | 10-2015-0084626 | A | 7/2015 |
| KR | 10-1578163 | B1 | 12/2015 |
| KR | 10-2016-0140399 | A | 12/2016 |
| KR | 10-1698131 | B1 | 1/2017 |
| KR | 10-1853176 | B1 | 4/2018 |

OTHER PUBLICATIONS

Korean Office Action dated Feb. 13, 2020 in corresponding Korean Patent Application No. 10-2019-0003179. (2 pages in Korean).

* cited by examiner

[FIG. 1]
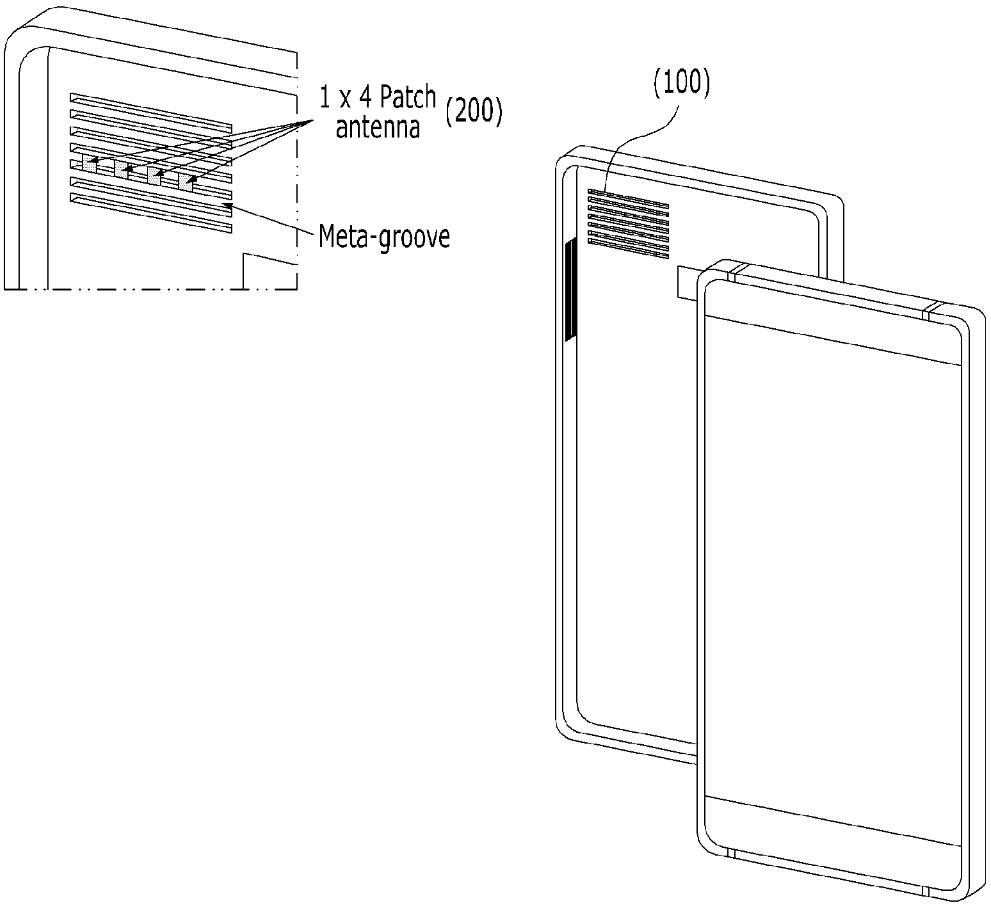

[FIG. 2A]
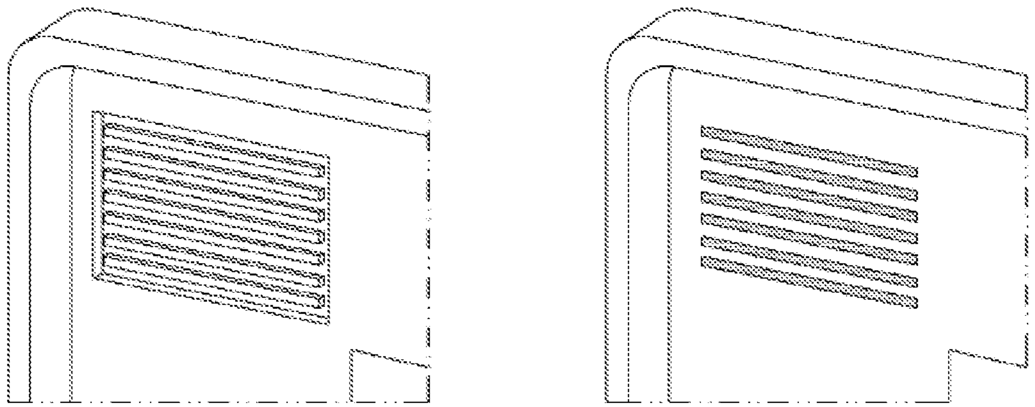
[FIG. 2B]
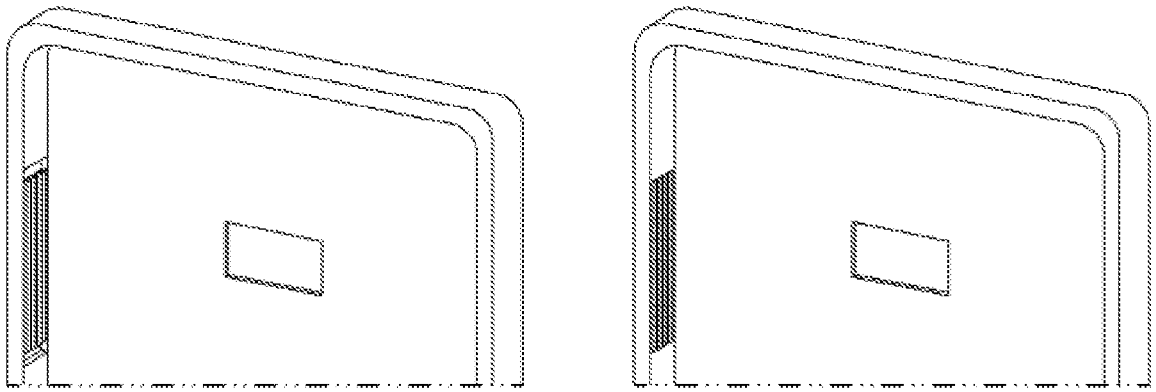
[FIG. 2C]
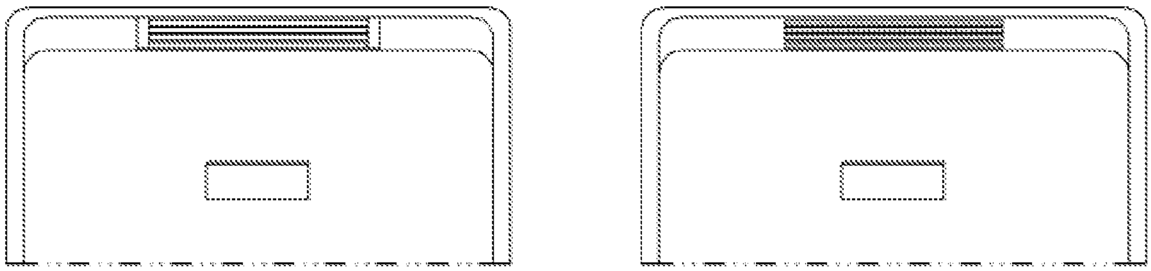

[FIG. 3A]
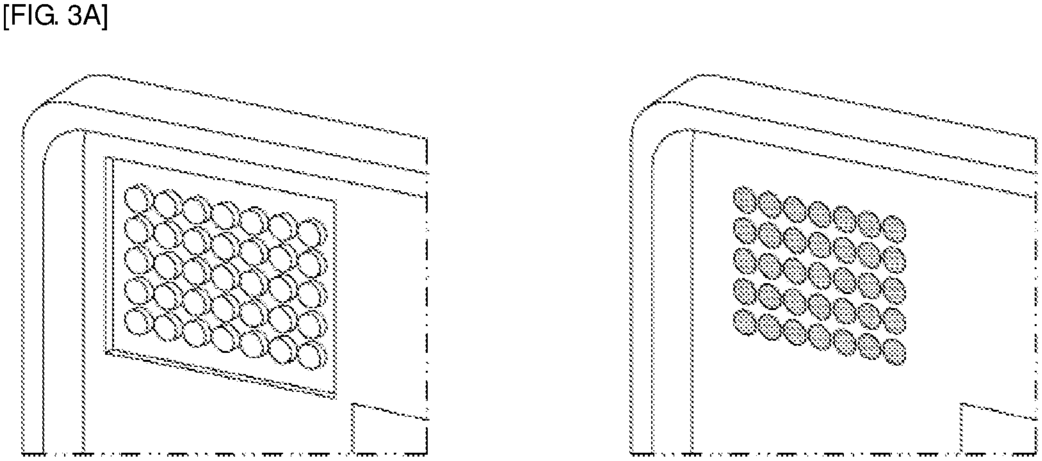
[FIG. 3B]
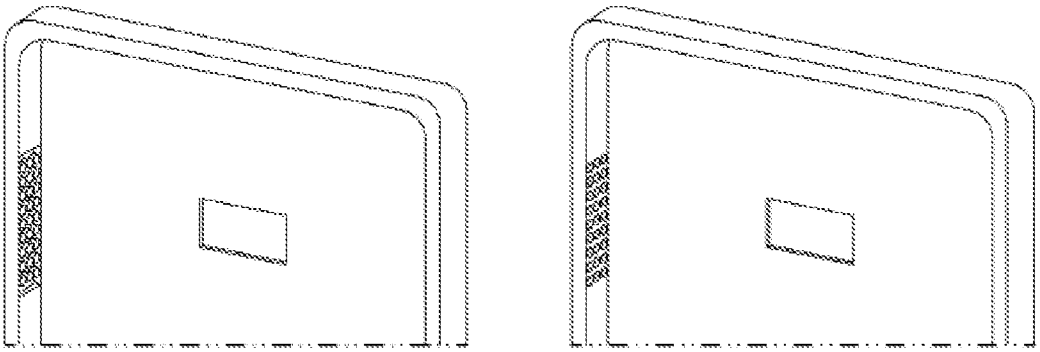
[FIG. 3C]
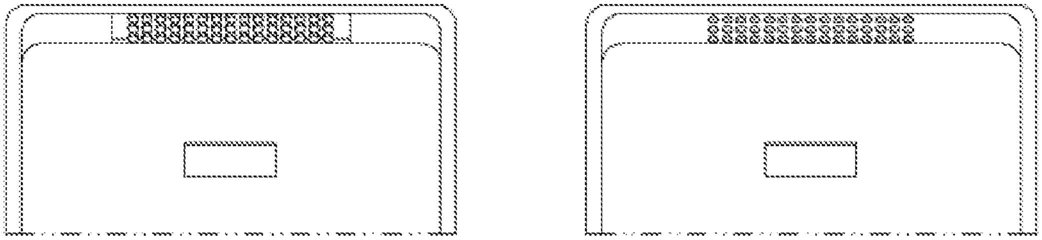

[FIG. 4A]
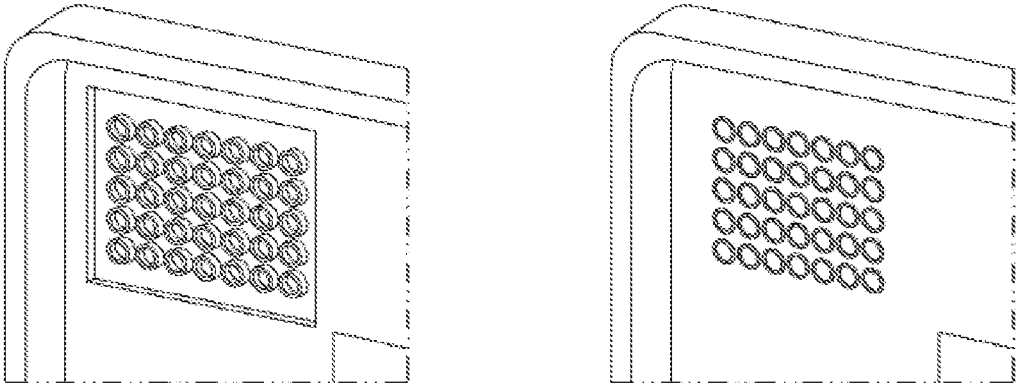
[FIG. 4B]
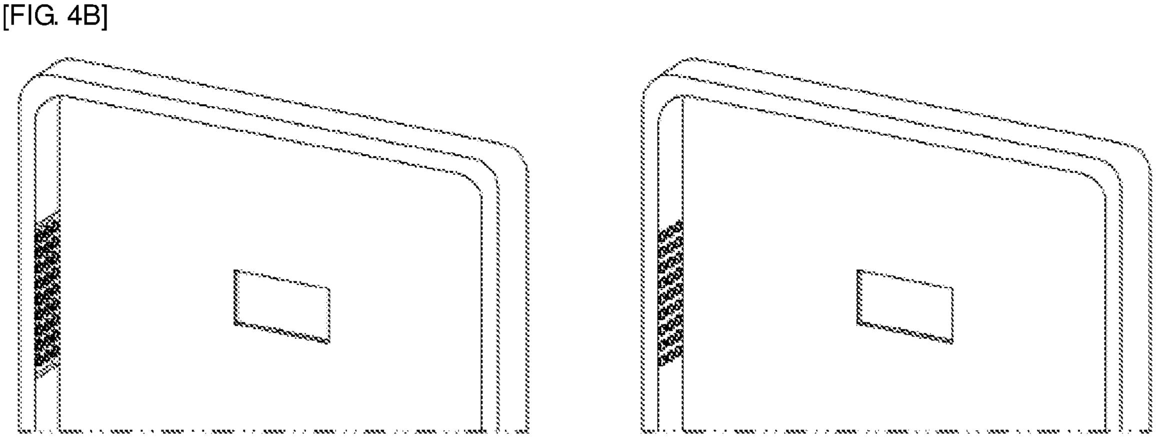
[FIG. 4C]
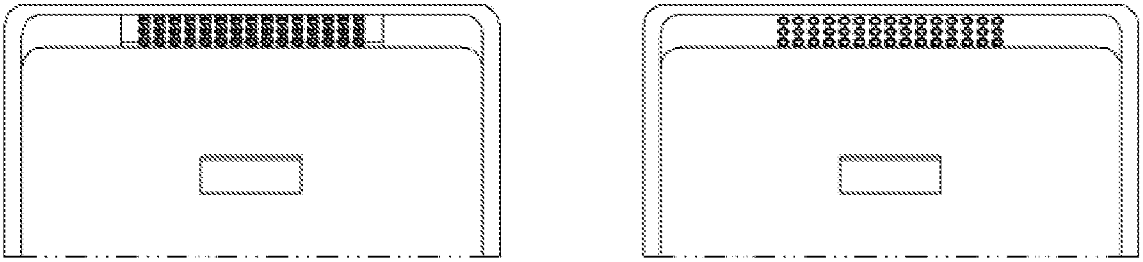

[FIG. 5A]
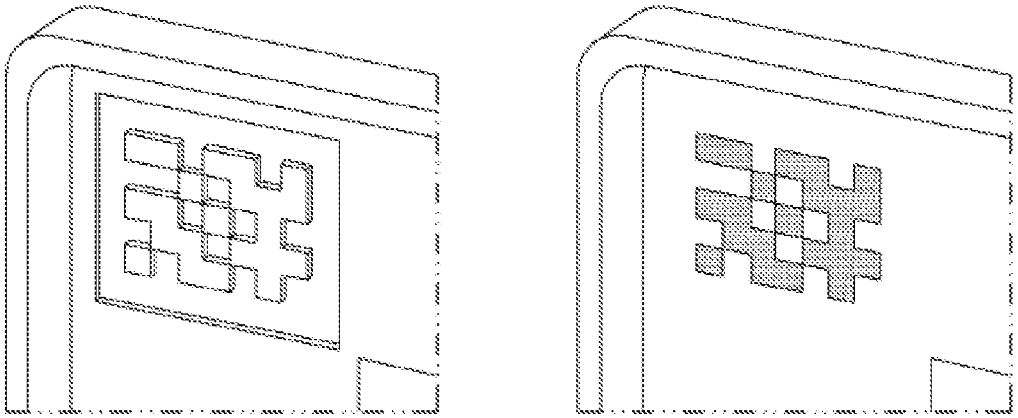
[FIG. 5B]
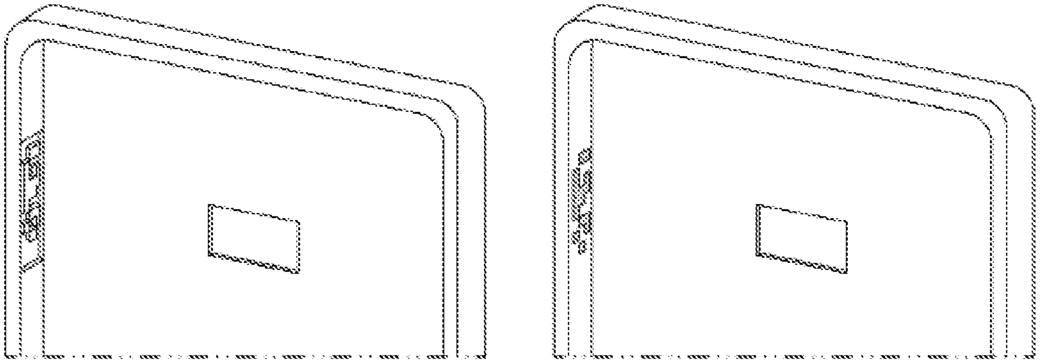
[FIG. 5C]
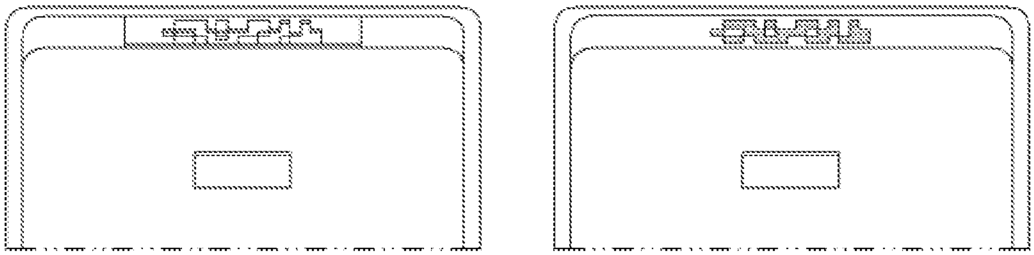

[FIG. 6A]
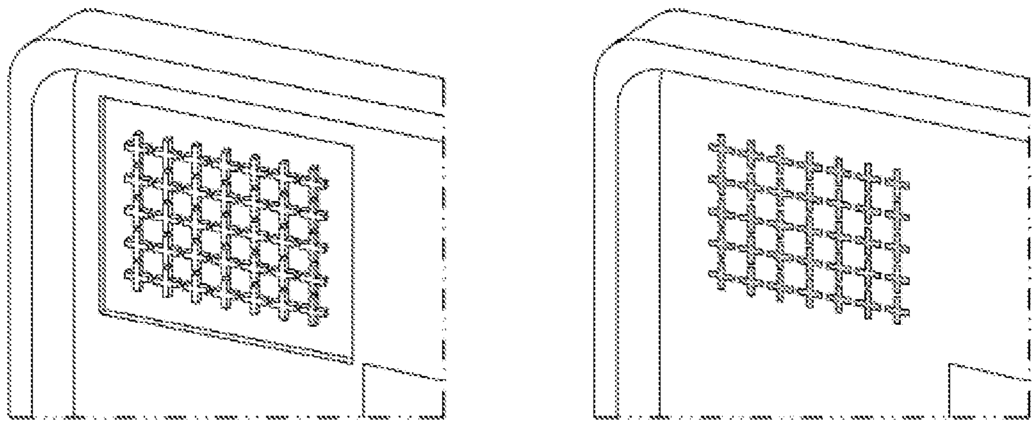
[FIG. 6B]
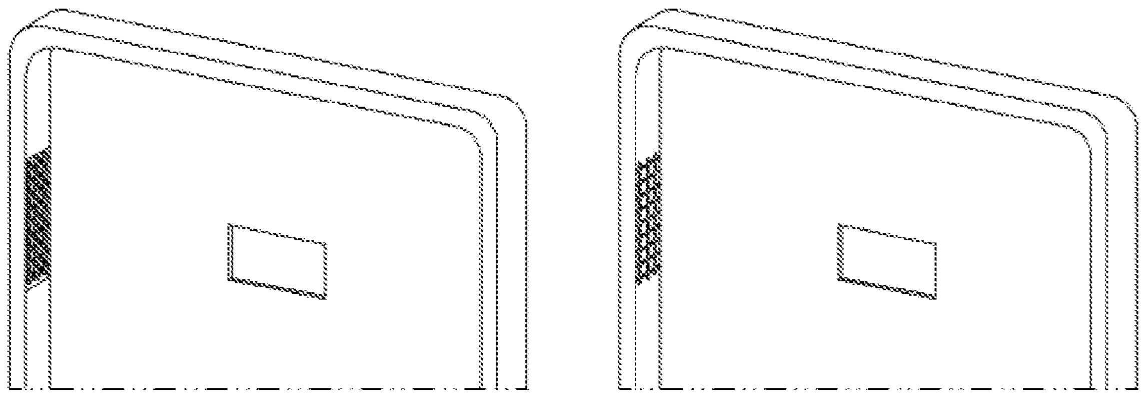
[FIG. 6C]
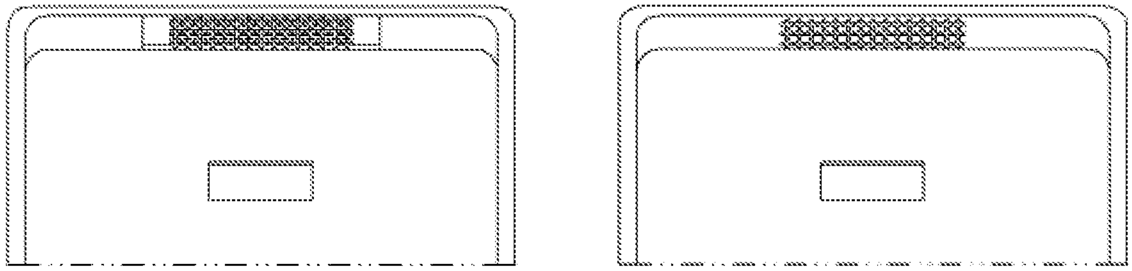

[FIG. 7A]
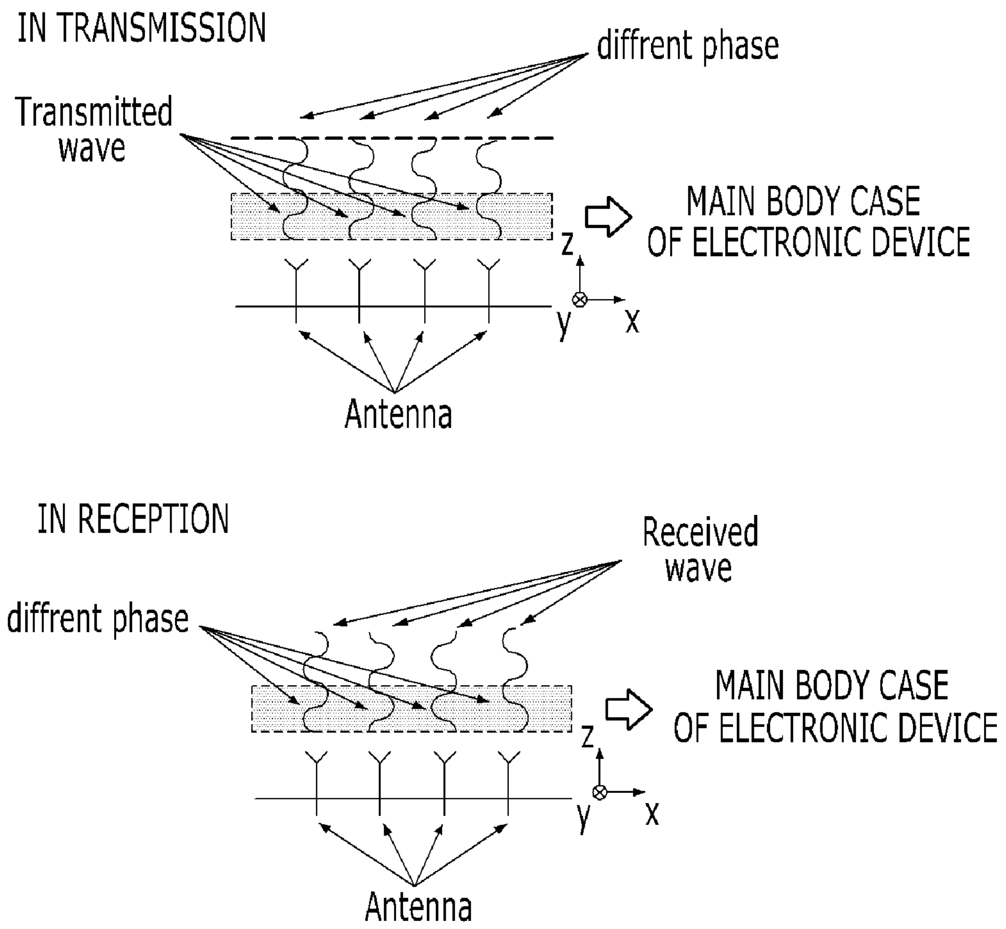

[FIG. 7B]
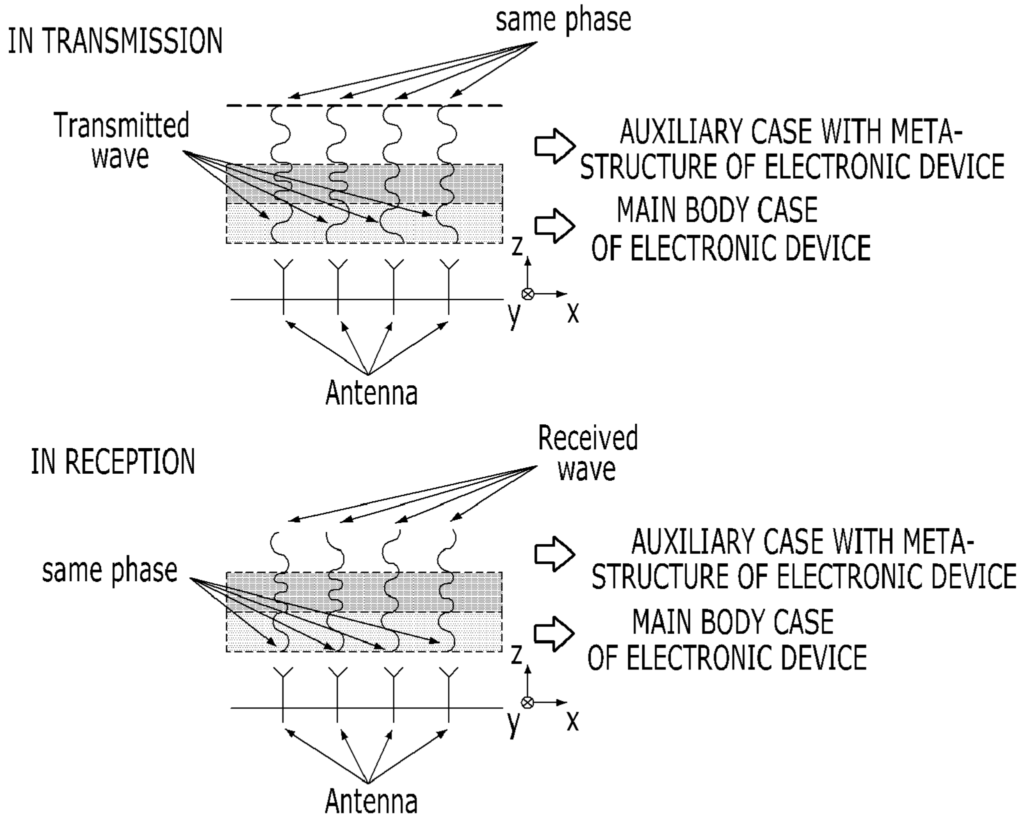

[FIG. 8A]
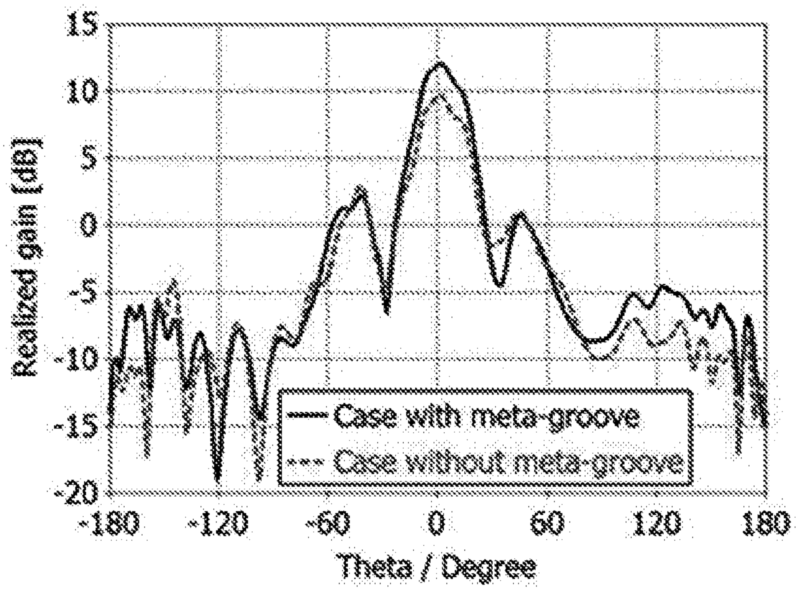
[FIG. 8B]
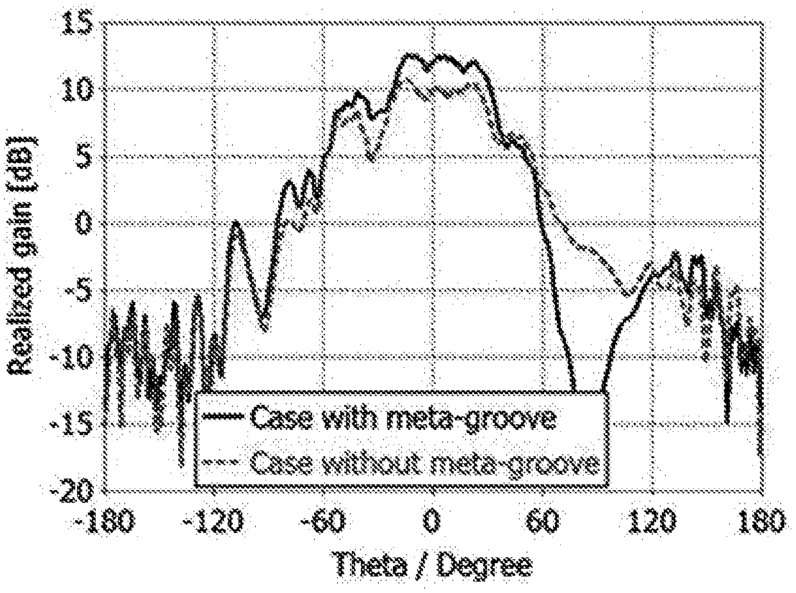

CASE FOR ELECTRONIC DEVICE

CROSS-REFERENCE TO RELATED APPLICATIONS

This application claims the priority of Korean Patent Application No. 10-2019-0003179 filed on Jan. 10, 2019, in the Korean Intellectual Property Office, the disclosure of which is incorporated herein by reference.

BACKGROUND

Field

The present disclosure relates to a case for an electronic device and, more particularly, to a case for an electronic device in which a meta-structure having an asymmetric and non-periodic phase change structure, that is, an electromagnetism structure of a 3D-shaped meta-groove or meta-patch is formed. A case for an electronic device can improve the gain of antennas by compensating for the phase of electromagnetic waves changed by surrounding structures with an appropriate value by selecting the meta-structure having an asymmetric and non-periodic phase change structure.

Description of the Related Art 2G, 3G, and 4G cellular systems that are systems before 5G are operated in bands of 600 MHz to 3.8 GHz. However, since 5G uses a frequency in a millimeter wave range, it uses a higher frequency that those of 2G, 3G, and 4G cellular system. The higher the frequency, the wider the frequency width can be secured, so there is the advantage that it is advantageous in high-speed data transmission, but there is a problem that the performance of antennas is deteriorated due to dispersion by surrounding structure when the antennas are mounted in electronic devices.

PRIOR ART DOCUMENT

Patent Document

Korean Patent No. 10-1578163 (2015 Dec. 10)

SUMMARY

In order to solve the problems, an object of the present disclosure is to provide a case for an electronic device that improves the gain of an antenna by compensating for the phase of electromagnetic waves changed due to surrounding structure with an appropriate value by employing a meta-structure having an asymmetric and non-periodic phase change structure, that is, an electromagnetism structure of a 3D-shaped meta-groove or meta-patch.

In order to achieve the objects, a case for an electronic device includes meta-groves having different structures and formed symmetrically, asymmetrically, periodically, or non-periodically or meta-patches attached to the meta grooves symmetrically, asymmetrically, periodically, or non-periodically.

Further, the meta-grooves or the meta-patches of the case for an electronic device according to the present disclosure for achieving the objects are formed in bar shapes on a front, a side edge, or a top edge.

Further, the meta-grooves or the meta-patches of the case for an electronic device according to the present disclosure for achieving the objects are formed in circular shapes on a front, a side edge, or a top edge.

Further, the meta-grooves or the meta-patches of the case for an electronic device according to the present disclosure for achieving the objects are formed in ring shapes on a front, a side edge, or a top edge.

Further, the meta-grooves or the meta-patches of the case for an electronic device according to the present disclosure for achieving the objects are formed in binary pixel shapes on a front, a side edge, or a top edge.

Further, the meta-grooves or the meta-patches of the case for an electronic device according to the present disclosure for achieving the objects are formed in cross shapes on a front, a side edge, or a top edge.

Further, the meta-patches of the case for an electronic device according to the present disclosure for achieving the objects are formed in at least a partial area of the meta-grooves.

Since the case for an electronic device improves the performance of antennas by having a meta-groove/patch structure, there is an effect that it is possible to usefully use a mobile electronic device including arranged antennas therein even in a 5G environment having a millimeter wave band.

Further, the electronic device according to the present disclosure can improve the gain of an antenna by compensating for the phase of electromagnetic waves changed due to surrounding structure with an appropriate value by employing a meta-structure having an asymmetric and non-periodic phase change structure, that is, an electromagnetism structure of a 3D-shaped meta-groove or meta-patch.

Further, the case for an electronic device according to the present disclosure has a large ripple effect in the market of cases for electronic devices in term that it overcomes the limit by improving the performance an antenna with a built-in 5G antennas having a millimeter wave band, using an auxiliary case that is generally used by users having individual electronic devices to protect expensive electronic devices from physical shocks with antennas mounted in terminals.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1 is a perspective view of a case for an electronic device according to the present disclosure;

FIGS. 2A to 2C are views showing the state in which bar-shaped meta-grooves are formed or meta-patches are attached on a case for an electronic device according to the present disclosure;

FIGS. 3A to 3C are views showing the state in which circular meta-grooves are formed or meta-patches are attached on a case for an electronic device according to the present disclosure;

FIGS. 4A to 4C are views showing the state in which circular ring-shaped meta-grooves are formed or meta-patches are attached on a case for an electronic device according to the present disclosure;

FIGS. 5A to 5C are views showing the state in which binary pixel-shaped meta-grooves are formed or meta-patches are attached on a case for an electronic device according to the present disclosure;

FIGS. 6A to 6C are views showing the state in which cross-shaped meta-grooves are formed or meta-patches are attached on a case for an electronic device according to the present disclosure;

FIGS. 7A and 7B are views showing the phases of electromagnetic waves according to whether a case for an electronic device having a meta-structure is mounted.

FIGS. 8A and 8B are graphs showing the gains of antennas according to whether a case for an electronic device having a meta-structure is mounted.

DETAILED DESCRIPTION OF THE PREFERRED EMBODIMENT

The present disclosure may be modified in various ways and implemented by various exemplary embodiments, so that specific exemplary embodiments are shown in the drawings and will be described in detail. However, it is to be understood that the present disclosure is not limited to the specific exemplary embodiments, but includes all modifications, equivalents, and substitutions included in the spirit and the scope of the present disclosure. Similar reference numerals are assigned to similar components in the following description of drawings.

Terms 'first', 'second', 'A', 'B', etc., may be used to describe various components, but the components are not to be construed as being limited to the terms. The terms are used only to distinguish one component from another component. For example, the 'first' component may be named the 'second' component, and vice versa, without departing from the scope of the present invention. The term 'and/or' includes a combination of a plurality of relevant items or any one of a plurality of relevant terms.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Terms used in the present specification are used only in order to describe specific exemplary embodiments rather than limiting the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless defined otherwise, it is to be understood that all the terms used in the specification including technical and scientific terms has the same meaning as those that are understood by those who skilled in the art. It will be further understood that terms used herein should be interpreted as having a meaning that is consistent with their meaning in the context of this specification and the relevant art and will not be interpreted in an idealized or overly formal sense unless expressly so defined herein.

When a part includes a component throughout the specification and claims, it means that the part may further include another component rather than another component unless specifically stated otherwise.

Hereinafter, preferred embodiments of the present disclosure will be described in detail with reference to the accompanying drawings.

FIG. 1 is a perspective view of a case for an electronic device according to the present disclosure.

A case for an electronic device according to the present disclosure includes a meta-groove 100 or a meta-patch 200 having various structures and attached to the same or similar positions to the meta-groove 100.

Various embodiments of the case for an electronic device according to the present disclosure which has the configuration described above are described.

FIGS. 2A to 2C show a first embodiment of a case for an electronic device according to the present disclosure, in which meta-grooves 100 are formed in bar shapes.

The bar-shaped meta-grooves 100 may be formed on the front, as shown in at the left side in FIG. 2A, may be formed on the side edge, as shown at the left side in FIG. 2B, or may be formed on the top edge, as shown at the left side in FIG. 2C.

Further, the bar-shaped meta-patches 200 may be made of a metal material, and may be attached to the front, as shown in at the right side in FIG. 2A, may be attached to the side edge, as shown at the right side in FIG. 2B, or may be attached to the top edge, as shown at the right side in FIG. 2C.

FIGS. 3A to 3C show a second embodiment of a case for an electronic device according to the present disclosure, in which meta-grooves 100 are formed in circular shapes.

The circular meta-grooves 100 may be formed on the front, as shown in at the left side in FIG. 3A, may be formed on the side edge, as shown at the left side in FIG. 3B, or may be formed on the top edge, as shown at the left side in FIG. 3C.

Further, the circular meta-patches 200 may be made of a metal material, and may be attached to the front, as shown in at the right side in FIG. 3A, may be attached to the side edge, as shown at the right side in FIG. 3B, or may be attached to the top edge, as shown at the right side in FIG. 3C.

FIGS. 4A to 4C show a third embodiment of a case for an electronic device according to the present disclosure, in which meta-grooves 100 are formed in circular ring shapes.

The circular ring-shaped meta-grooves 100 may be formed on the front, as shown in at the left side in FIG. 4A, may be formed on the side edge, as shown at the left side in FIG. 4B, or may be formed on the top edge, as shown at the left side in FIG. 4C.

Further, the circular ring-shaped meta-patches 200 may be made of a metal material, and may be attached to the front, as shown in at the right side in FIG. 4A, may be attached to the side edge, as shown at the right side in FIG. 4B, or may be attached to the top edge, as shown at the right side in FIG. 4C.

FIGS. 5A to 5C show a fourth embodiment of a case for an electronic device according to the present disclosure, in which meta-grooves 100 are formed in binary pixel shapes.

The binary pixel-shaped meta-grooves 100 may be formed on the front, as shown in at the left side in FIG. 5A, may be formed on the side edge, as shown at the left side in FIG. 5B, or may be formed on the top edge, as shown at the left side in FIG. 5C.

Further, the binary pixel-shaped meta-patches 200 may be made of a metal material, and may be attached to the front, as shown in at the right side in FIG. 5A, may be attached to the side edge, as shown at the right side in FIG. 5B, or may be attached to the top edge, as shown at the right side in FIG. 5C.

The binary pixel shapes of FIGS. 5A to 5C are engraved or embossed by freely selecting several pixels from n×m pixels formed in rectangular shapes.

Accordingly, FIGS. 5A to 5C show one example of binary pixels and other types of binary pixels can also be implemented.

FIGS. 6A to 6C show a fifth embodiment of a case for an electronic device according to the present disclosure, in which meta-grooves 100 are formed in cross shapes.

The cross-shaped meta-grooves 100 may be formed on the front, as shown in at the left side in FIG. 6A, may be formed on the side edge, as shown at the left side in FIG. 6B, or may be formed on the top edge, as shown at the left side in FIG. 6C.

Further, the cross-shaped meta-patches 200 may be made of a metal material, and may be attached to the front, as shown in at the right side in FIG. 6A, may be attached to the side edge, as shown at the right side in FIG. 6B, or may be attached to the top edge, as shown at the right side in FIG. 6C.

Referring to FIG. 1 again, FIG. 1 shows the shape of an auxiliary case having meta-grooves 100 in an electronic device. A 1×4 patch antenna was introduced, as shown in FIG. 1, to examine the effect of the auxiliary case having a meta-structure proposed herein. Various antennas such as a dipole antenna or a PIFA (Planar Inverted F-antenna) may be used other than the patch type antennas, and the antennas are not fixed at specific positions and may be positioned on the rear or sides.

The performance of a 5G electronic device is improved by applying a meta-structure having an asymmetric and non-periodic phase change structure to the surface of a case for an electronic device on which the 1×4 patch antenna is disposed, and the meta-structure composed of the meta-grooves 100 or the meta-patches 200 may be formed in various shapes such as a circular shape, a ring shape, and a rectangular pattern.

Phase correction effects on electromagnetic waves when a case for an electronic device which has the meta-structure described above is provided and is not provided are shown in FIGS. 7A and 7B.

FIGS. 7A and 7B are views showing the phases of electromagnetic waves according to whether a case for an electronic device having a meta-structure is mounted. The phases of the electromagnetic waves that are transmitted/received by antennas disposed in an electronic device are in different environments, as shown in FIG. 7A, due to the influence by surrounding structures.

When the phases of the electromagnetic waves transmitted/received by antennas are different, the gains of the arranged antennas decreases, and it is required to correct the phases of the electromagnetic waves transmitted/received by antennas in order to improve the gain.

Such correction of phases of electromagnetic waves is achieved by applying a meta-structure to a case for an electronic device. The traveling speed of an electromagnetic wave depends on permittivity and electromagnetic waves that are transmitted/received by antennas have different traveling speeds in a meta-structure due to the difference in permittivity between the air and an electronic device.

Accordingly, the phases of the electromagnetic waves that are transmitted/received from antennas are corrected, whereby, as show in FIG. 7B, the electromagnetic waves are given the same phase and the gains of the antennas are improved. The gain of an antenna is in proportion to the area of the antenna and there is a limit in improving the gain in a limited space inside an electronic device.

The case for an electronic device according to various embodiments of the present disclosure may be an accessory (e.g., an auxiliary case) that can be coupled to the main case (e.g., a housing) of an electronic device or to the electronic device. According to the case for an electronic device of the present disclosure, it is possible to overcome the limit by improving the performance an antenna with a built-in 5G antennas having a millimeter wave band, using an auxiliary case that is generally used by users having individual electronic devices to protect expensive electronic devices from physical shocks with antennas mounted in terminals.

FIGS. 8A and 8B show the gains of a 1×4 patch antenna according to whether the meta-grooves 100 are applied to a case for an electronic device or not. In the graphs, the black solid line is a gain graph when an electronic device is covered with an auxiliary case having the meta-grooves 100 and the red dotted line is a gain graph when an electronic device is covered with an auxiliary case without the meta-grooves 100.

As described above, the phase values of the electromagnetic waves radiated from antennas were compensated by applying the meta-grooves 100 to a case for an electronic device, so the gain was improved, as compared with when the auxiliary case without the meta-grooves 100 was applied.

For reference, the meta-grooves and the meta-patches are shown periodically or symmetrically in the drawings, but they may be achieved non-periodically or asymmetrically.

The gain in the +z direction of the 1×4 when the auxiliary case without the meta-grooves 100 was applied was 9.57 dB, and the gain in the +z direction of the 1×4 when the auxiliary case having the meta-grooves 100 was applied was improved 11.84 dB by 2.27 dB.

The embodiment of the meta-grooves 100 can be implemented in various shapes that can control phases, as described above.

Further, the antenna of which the performance can be improved may also include a dipole antenna that is mounted to radiate end-fire in addition to the patch antenna.

The above description merely explains the spirit of the present disclosure and the present disclosure may be changed and modified in various ways without departing from the spirit of the present disclosure by those skilled in the art. Accordingly, the embodiments described herein are provided merely not to limit, but to explain the spirit of the present disclosure, and the spirit of the present disclosure is not limited by the embodiments. The protective range of the present disclosure should be construed by the following claims and the scope and spirit of the present disclosure should be construed as being included in the patent right of the present disclosure.

What is claimed is:

1. An auxiliary case attachable to a main case for housing an electronic device, the auxiliary case comprising:

meta-grooves having different structures and formed symmetrically, asymmetrically, periodically, or non-periodically, at a position facing at least one antenna included in the electronic device when the auxiliary case is attached to the main case, or meta-patches attached symmetrically, asymmetrically, periodically, or non-periodically, at a position facing the at least one antenna included in the electronic device when the auxiliary case is attached to the main case, wherein the meta-grooves are formed on the auxiliary case, or the meta-patches are attached to a position corresponding to the meta-grooves.

2. The auxiliary case of claim 1, wherein the meta-grooves or the meta-patches are formed in bar shapes on a front, a side edge, or a top edge of the auxiliary case.

3. The auxiliary case of claim 1, wherein the meta-grooves or the meta-patches are formed in circular shapes on a front, a side edge, or a top edge of the auxiliary case.

4. The auxiliary case of claim 1, wherein the meta-grooves or the meta-patches are formed in circular ring shapes on a front, a side edge, or a top edge of the auxiliary case.

5. The auxiliary case of claim 1, wherein the meta-grooves or the meta-patches are formed in binary pixel shapes on a front, a side edge, or a top edge of the auxiliary case.

6. The auxiliary case of claim 1, wherein the meta-grooves or the meta-patches are formed in cross shapes on a front, a side edge, or a top edge of the auxiliary case.

7. The auxiliary case of claim 1, wherein the meta-patches are formed in at least a partial area of the meta-grooves.

8. A case for an electronic device, the case comprising:

at least one of meta-grooves having different structures and formed symmetrically, asymmetrically, periodically, or non-periodically, or meta-patches attached symmetrically, asymmetrically, periodically, or non-periodically, at a position facing at least one antenna included in the case for electronic device, wherein the meta-patches are formed in at least a partial area of the meta-grooves.

* * * * *